United States Patent
Goodman

(10) Patent No.: US 7,086,049 B2
(45) Date of Patent: Aug. 1, 2006

(54) BACKGROUND CODE UPDATE FOR EMBEDDED SYSTEMS

(75) Inventor: Brian Gerard Goodman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 683 days.

(21) Appl. No.: 10/083,784

(22) Filed: Feb. 26, 2002

(65) Prior Publication Data

US 2003/0163508 A1 Aug. 28, 2003

(51) Int. Cl.
G06F 9/44 (2006.01)
G06F 9/46 (2006.01)
G06F 12/00 (2006.01)

(52) U.S. Cl. ............... 717/168; 717/124; 711/103; 713/100; 718/108

(58) Field of Classification Search ........... 717/168, 717/171, 172, 170; 709/220, 221; 713/1, 713/2, 200, 100; 711/103; 718/108
See application file for complete search history.

(56) References Cited

U.S. PATENT DOCUMENTS

| | | | | |
|---|---|---|---|---|
| 4,077,058 A | * | 2/1978 | Appell et al. ............ 717/162 |
| 4,974,191 A | * | 11/1990 | Amirghodsi et al. ........... 704/8 |
| 5,132,716 A | * | 7/1992 | Samuels et al. ............ 396/622 |
| 5,355,490 A | * | 10/1994 | Kou ............................. 713/100 |
| 5,420,984 A | * | 5/1995 | Good et al. .................. 710/22 |
| 5,822,692 A | * | 10/1998 | Krishan et al. ............. 455/419 |
| 5,826,075 A | * | 10/1998 | Bealkowski et al. ........ 713/187 |
| 5,872,975 A | | 2/1999 | Hedin et al. |
| 5,898,849 A | * | 4/1999 | Tran ............................ 712/203 |
| 5,926,646 A | * | 7/1999 | Pickett et al. .................. 712/32 |
| 5,930,504 A | | 7/1999 | Gabel |
| 5,938,766 A | * | 8/1999 | Anderson et al. ........... 713/100 |
| 5,938,774 A | | 8/1999 | Hsu |
| 5,978,912 A | * | 11/1999 | Rakavy et al. ................. 713/2 |
| 6,023,704 A | * | 2/2000 | Gerard et al. ........... 707/103 R |

(Continued)

FOREIGN PATENT DOCUMENTS

DE 19946959 A1 * 4/2001

OTHER PUBLICATIONS

Chappell et al., "Simultaneous subordinate microthreading (SSMT)", May 1999, Proceedings of the 26th International Symposium on Computer Architecture, pp. 186-195.*

(Continued)

Primary Examiner—Chameli C. Das
Assistant Examiner—J. Derek Rutten
(74) Attorney, Agent, or Firm—Scully, Scott, Murphy & Presser, P.C.; John Kennel, Esq.

(57) ABSTRACT

An embedded system and method for performing a background code update of a current code image with an incoming code image is provided. The method includes executing the current code image in the embedded system; executing one or more code update routines from the incoming code image to update the current code image with the incoming code image; and executing a task switching function from the current code image to switch microprocessor control from executing the one or more code update routines of the incoming image to execute a function in the current code image. The system and method also involves retrieving an offset from the incoming code image for the one or more code update routines in the incoming code image. The system and method further involves retrieving an offset from the current code image of a task switching function.

41 Claims, 5 Drawing Sheets

U.S. PATENT DOCUMENTS

| | | | |
|---|---|---|---|
| 6,031,867 | A | 2/2000 | Johnson et al. |
| 6,078,967 | A | 6/2000 | Fulghum |
| 6,182,187 | B1 | 1/2001 | Cox et al. |
| 6,192,469 | B1 | 2/2001 | Smalley et al. |
| 6,212,632 | B1 | 4/2001 | Surine et al. |
| 6,237,091 | B1 | 5/2001 | Firooz et al. |
| 6,260,150 | B1 | 7/2001 | Diepstraten et al. |
| 6,266,809 | B1 | 7/2001 | Craig et al. |
| 6,625,749 | B1 * | 9/2003 | Quach ......................... 714/10 |
| 6,779,173 | B1 * | 8/2004 | Yomiya et al. ............. 717/121 |
| 2002/0092008 | A1 * | 7/2002 | Kehne et al. ................ 717/168 |

OTHER PUBLICATIONS

Theo Ungerer, Borut Robič, Jurij Šilc, "A survey of processors with explicit multithreading", Mar. 2003, ACM Computing Surveys (CSUR), vol. 35 Issue 1, pp. 29-63, ISSN:0360-0300.*

John R. Levine, "Linkers and Loaders", Oct. 1999, Morgan-Kaufmann Publishers, ISBN 1-55860-496-0, Chapters 3 and 7.*

"Understanding Computers: Input/Output", 1986, Time-Life Books, ISBN 0-8094-7562-6, pp. 26 and 27.*

John Lombardo, "Embedded Linux", Jul. 25, 2001, New Riders Publishing, ISBN : 0-7357-0998-X, Section 1.6: "Upgrading the Software in Place".*

Silberschatz and Galvin, "Operating System Concepts", Dec. 1997, Addison-Wesley, 5th Edition, ISBN 0-201-59113-8, Chapter 5.*

* cited by examiner

BACKGROUND CODE UPDATE FOR EMBEDDED SYSTEMS

BACKGROUND OF THE INVENTION

1. Technical Field of the Invention

The present invention generally relates to embedded systems. More particularly, the present invention is directed to an embedded system and method for performing a background code update by utilizing firmware update routines from an incoming code image and task switching capabilities, i.e., task switching function, from an executing code image.

2. Description of the Prior Art

An embedded system is a specialized computer system, including both hardware and software, which forms a part of a larger system or machine. Furthermore, the larger system or machine may have a plurality of embedded systems. Typically, each of the embedded systems is housed on single microprocessor board with firmware (i.e., software) stored as object code within a non-volatile memory device, such as a programmable read only memory (i.e., "PROM"). The larger system or machine that generally utilizes the embedded system may include a wide variety of systems, ranging from modems, to mid-range computing devices and enterprise systems, to storage automation libraries, to digital satellite receivers, and the like. The embedded systems commonly utilize firmware that provides an operating system enabling multitasking, which simplifies a process of performing a plurality of actions with a single microprocessor. With multitasking, the microprocessor is utilized more efficiently because the idle time associated with performing one action may be utilized for performing another action. For example, a servo control function may be waiting for a interval to elapse (i.e., via a timer) before checking position control parameters of a robotic component of the larger system or machine. While waiting for the timer to expire, the microprocessor may send or receive small computer system interface (i.e., "SCSI") data through another function. These actions are often called processes, threads, tasks, or process threads. Hereinafter, the foregoing actions will be referred to as process threads for simplicity and clarity.

The act of switching between the process threads is called task switching. Task switching based on each process thread voluntarily giving up microprocessor time is commonly referred to as "round robin" task switching. Alternatively, task switching resulting from a resource becoming available or from a function call to signal another process thread (e.g., via sending a message between the two process threads) is commonly referred to as "event driven" task switching. Moreover, task switching based on periodically switching microprocessor control between process threads via a timer or some other trigger is commonly referred to as "time slice" task switching. Additionally, combinations of the foregoing task switching options may be utilized in a particular embedded system. From among the foregoing options, the time slice task switching option tends to be less efficient because a task switch may occur at times other than idle times, thereby wasting processing resources (i.e., unnecessary task switching consumes microprocessor bandwidth). Additionally, time slice task switching is generally more complicated to set up and can create a variety of problems.

Typically, an embedded system provides for a code update process to support new features or to fix problems in the firmware (i.e., firmware upgrade). In many cases, the firmware upgrade will take the larger system or machine—of which the embedded system forms a part—out of service for some period of time during which the firmware upgrade is performed. For the systems which are utilized for critical applications or which are utilized a high percentage of time, it is advantageous to provide a background code update that does not take the larger system out of service. Background updates to the firmware are known in the art. One way the background code update may be achieved is by executing the system code out of memory devices other than those being upgrade. For example, a system firmware that needs to be updated may reside in a programmable read-only memory (i.e., "PROM") prior to power-up. The system firmware stored on the PROM may be copied to a random access memory (i.e., "RAM") during a power-on sequence and subsequently executed in the RAM. Thus, the system firmware on the PROM may be updated because the current system firmware is executed from the RAM. This is of critical importance because many nonvolatile devices cannot be updated while in use. In addition, overwriting currently executing firmware may result in unpredictable consequences. Therefore, by executing firmware from a separate memory device, a code update to the firmware may occur while the system operates normally utilizing one or more other process threads of the firmware, thereby accomplishing a background code update to the firmware.

Utilizing code update routines from the firmware update itself has associated advantages. A first advantage obtained by utilizing code update routines from the firmware update is elimination of the need to test a newer firmware update against every previous version of firmware that may be present in the field. That is, without utilizing the code update routines from the firmware update, firmware update compatibility between the previous version of the firmware and the newer firmware version may be uncertain and must be tested before attempting an upgrade at a customer site. A further advantage is the whole structure of the previous version of firmware, in PROM, can be updated without any special interim firmware updates at the customer site. For example, the previous firmware installed at the customer site may support a single copy of the firmware in the PROM, while the new version of the firmware may support a boot sector and two copies of the firmware. The update of the previous version of the firmware to the advanced new version that supports the boot sector and the two code copies of the firmware would normally require an intermediate (i.e., "special") code load that would prepare the embedded system for the firmware update because the previous firmware's code update routines have no prior knowledge about the boot sector and the two copies of the new firmware version. If a firmware update were attempted without the special code load, the embedded system and even the larger system of which the embedded system being updated forms a part may become inoperative. However, the code update routines of the firmware update know all about the details of the firmware update because these routines are part of the new firmware that supports a boot sector and two copies of the firmware. That is, the location of the firmware update routines is provided as part of the new firmware update. The location of the code update routines may be implied as a fixed offset in the new firmware update, or it may be provided as a pointer within the new firmware update. In addition, the code update routines may have a fixed execution point or a variable one. More particularly, 1) the code update routines may be compiled for execution from a particular location in the memory, such that the code update routines are always copied to the particular location in the memory before execution begins; or alternatively 2) the code update routines may be, and usually are, compiled as position independent code, so that they can be executed from any location within memory.

Notwithstanding the foregoing, there exists a problem with executing firmware update routines out of the firmware update. The problem is that function calls cannot be made outside the scope of the firmware update. For example, if the code update routines attempt to call a task switching function that is outside the scope of the update routines, unpredictable results may occur. That is, in order to invoke the task switching function, the new code update routines have to reference a memory map that is disparate from a current memory map associated with the new firmware. For example, assume the first alternative in which the new firmware update is compiled to execute at a base-starting hexadecimal address of 0x0C000000, which happens to be the address of the previous firmware's base-starting execution address after a reset and a copy to RAM. But, the temporary location of the new firmware update will be another hexadecimal address outside the scope of the previous firmware, such as OxOC100000, because the new firmware update is being received and cannot interfere with or be copied over the previous, currently executing, firmware. Any external address references that the new firmware update routines make will be based on the OxOC000000 starting hexadecimal address of the new compiled firmware update of which they are a part, but there is no telling what code alignment actually will reside in that space because it contains a version that is different from the previous, currently executing firmware. That is, elements within the new complied firmware update may not reside in the same relative position as like elements in the previous firmware, i.e., code in the new firmware update may be shifted either up or down with respect to the previous firmware.

Now assume the second alternative in which the firmware update is compiled as position independent code. This alternative creates different problems. For example, some microprocessors and compilers do not support position independent code. Additionally, with position independent code, external references are addressed as relative offsets. Therefore, although the new code update routines may include a task switching function, the task switching function will have external references to data and code areas, thereby creating problems described hereinabove with regard to the first alternative. For example, a task switching function may be located at hexadecimal address 0x0C080000 of the currently executing firmware. The same task switching function may be located at hexadecimal address 0x0C180340 of the new firmware. An attempt, by the new firmware update routines, to call the task switching function will result in a call to the hexadecimal address 0x0C180340. While this address is an accurate location of the task switching function of the new firmware, it may contain references to other memory locations such as a process thread state table. Such references may produce the same unpredictability as described in the previous example because the task switching function at hexadecimal address 0x0C080000 is based on another version of the firmware with potentially different address locations or offsets. That is, if the new firmware update is compiled as position independent code, then the task switching function from the new firmware update will attempt to access un-initialized code from the new firmware update. If the new firmware update image is compiled for direct addressing of the code, then the task switching function from the new firmware update image will experience the same potential offset problem described in the first alternative. Finally, a change to the task switching function could have unpredictable results if it were to attempt access to a data area initialized by the task switching function that used different data structures.

Therefore there is a need in the art of a system and method for providing a background code update that overcomes the above-identified problems associated with the prior art firmware updates. More particularly, there is a need to provide an embedded system and method that utilizes firmware update routines from the incoming firmware image while utilizing task switching capabilities, i.e., task switching function, from the executing firmware image.

SUMMARY OF THE INVENTION

It is therefore an object of the present invention to provide a system and method for an enhanced background code update in an embedded system.

It is another object of the present invention to provide a system and method for performing a background code update in an embedded system by utilizing update routines from the incoming firmware image while utilizing a task switching function from an executing firmware image.

According to an embodiment of the present invention, there is provided a method for performing a background code update of a current code image with an incoming code image in an embedded system, the method comprising the steps of: executing the current code image in the embedded system; executing one or more code update routines from the incoming code image to update the current code image with the incoming code image; and executing a task switching function from the current code image to switch microprocessor control from executing the one or more code update routines of the incoming image to execute a function in the current code image According to another embodiment of the present invention, there is provided an embedded system for performing a background code update of a current code image with an incoming code image, the system comprising: a first programmable memory device for storing the current code image; a microprocessor for executing the current code image in the embedded system and for executing the one or more code update routines to update the current code image with the incoming code image; and a task switching means for executing a task switching function in the current image to switch microprocessor control from executing the one or more code update routines of the incoming image to execute a function in the current code image.

According to yet another embodiment of the present invention, there is provided a storage automation library comprising an embedded system, the embedded system comprising: a first programmable memory device for storing the current code image; a microprocessor for executing the current code image in the embedded system and for executing the one or more code update routines to update the current code image with the incoming code image; and a task switching means for executing a task switching function in the current image to switch microprocessor control from executing the one or more code update routines of the incoming image to execute a function in the current code image.

According to further embodiment of the present invention, there is provided a program storage device, tangibly embodying a program of instructions executable by a machine to perform a method for performing a background code update of a current code image with an incoming code image in an embedded system, the method comprising the steps of: executing the current code image in the embedded system; executing one or more code update routines from the incoming code image to update the current code image with the incoming code image; and executing a task switching function from the current code image to switch microprocessor control from executing the one or more code update routines of the incoming image to execute a function in the current code image.

According to yet a further embodiment of the present invention, there is provided a method for performing a background code update of a current code image with an incoming code image in an embedded system, the method comprising the steps of: executing the current code image in the embedded system; retrieving an offset from the incoming code image of one or more code update routines in the incoming code image; executing the one or more code update routines to update the current code image with the incoming code image; retrieving an offset from the current code image of a task switching function upon a task switching event; and executing the task switching function to switch microprocessor control from executing the one or more code update routines of the incoming image to execute a function in the current code image.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENT OF THE INVENTION

The present invention is directed to a system and method for providing a background code update that overcomes the above-identified limitations associated with the prior art firmware updates. More particularly, the present invention provides an embedded system and method that utilizes firmware update routines from the incoming firmware image while utilizing a task switching capabilities, i.e., task switching function, from the firmware being updated. It is noted that hereinafter a task switching function represents a collection of executable computer instructions and not necessarily a call/return relationship. Therefore, it should be understood that the task switching function may comprise one or more functions for achieving the task switching capabilities.

Figure 1:
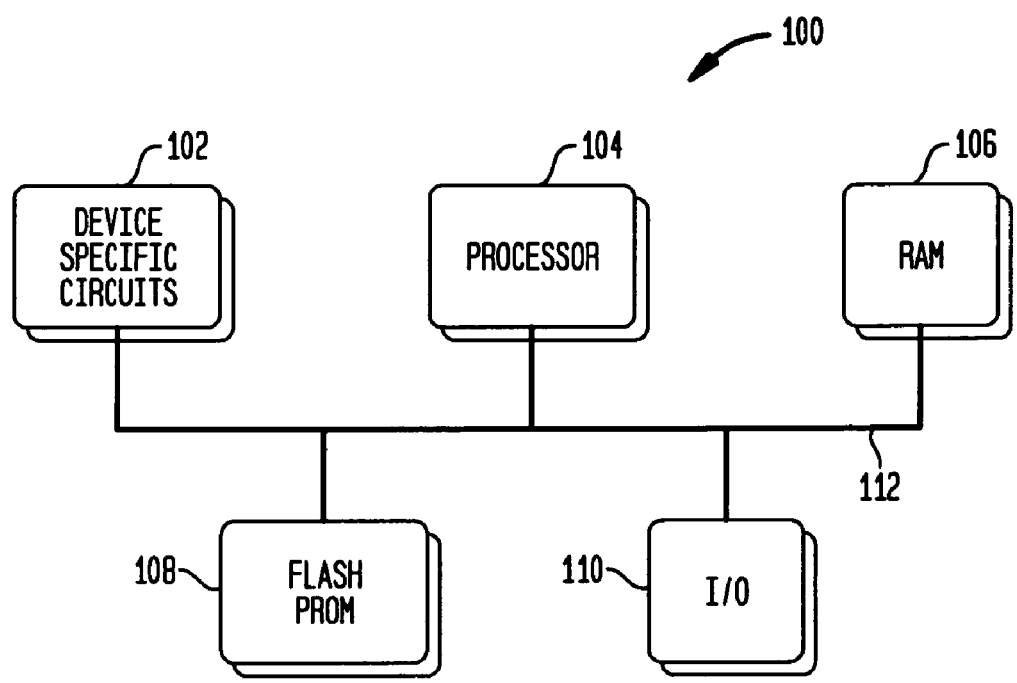
FIG. 1 is an exemplary block diagram of a suitable embedded system that is utilized to practice the exemplary method of FIG. 3 according to one embodiment of the present invention.

FIG. 1 is an exemplary block diagram of an embedded system 100 according to the present invention. The embedded system 100 of FIG. 1 comprises the following system components: device specific circuits 102; a microprocessor 104; a random access memory (i.e., "RAM") 106; nonvolatile memory device such as a flash programmable read only memory (i.e., "PROM") 108; an input/output interface (i.e., "I/O") 110; and a bus 112 that interconnects the foregoing system components. It is contemplated that different combinations of the foregoing system components as well as other components not shown in FIG. 1—e.g., real-time cock, digital to analog converter (i.e., "DAC") and analog to digital converter (i.e., "ADC")—may be integrated into the microprocessor 104, thereby forming an integrated microprocessor 104. For example, it is preferable to integrate the RAM 106 and the flash PROM 108 into the microprocessor 104. Alternatively, the RAM 106 and the PROM 108 may be combined in a single device, such as a battery backup RAM (not shown). It should be noted that the integration may achieve space/cost savings and/or greater processing speeds. Notwithstanding the component integration issue, the microprocessor will simply be referred to as the microprocessor 104. It is further also contemplated that the embedded system 100 may comprise more than one microprocessor 104 (not shown). The I/O interface 110 represents a communication interface that enables the microprocessor 104 to communicate with devices or systems that are external to the embedded system 100, such as another component of the overall system or an external host computer. The I/O interface 110 may include a plurality of different serial interfaces, such as versions of the Recommended Standard RS-232 (e.g., RS-422 and RS-423), Universal Serial Bus (i.e., "USB"), Institute of Electrical and Electronics Engineers 1394 standard (i.e., "IEEE 1394") that is trademarked, among other things, as "FireWire" by Apple, Controller Area Network (i.e., "CAN"), Ethernet, Small Computer System Interface (i.e., "SCSI"), Fibre Channel and the like. It is also contemplated that the I/O interface 110 may include wireless communication standards, such as radio frequency (i.e., "RF"), satellite, optical and the like.

According to the present invention, a firmware update is transmitted into the embedded system 100 via the I/O interface 110. The firmware update (i.e., incoming code image) may be transmitted from another microprocessor 104 in the embedded system (assuming more than one microprocessor 104), from an attached personal computer (i.e., "PC"), a remote PC through a wireless link, a modem and the like. The device specific circuits 102 provide additional hardware to enable the embedded system to perform unique functions. Examples of the unique functions may include motor control of robotic grippers for an automated data storage library as particularly illustrated in FIG. 4 below. However, the embedded system 100 of the present invention is not limited to the particular application illustrated in FIG. 4 and may be embedded in a wide variety of systems. While the foregoing description makes reference to flash PROM 108, it should be noted that that various nonvolatile memory devices may be used in the present invention. The various nonvolatile memory devices may include battery backup RAM; electronically erasable PROM (i.e., "EEPROM"); magnetic storage, such as, a hard drive or a floppy drive; optical storage, such as, Magneto Optical (i.e., "MO"); and the like. In addition, more than one nonvolatile memory device may be present in the embedded system 100.

Figure 2:
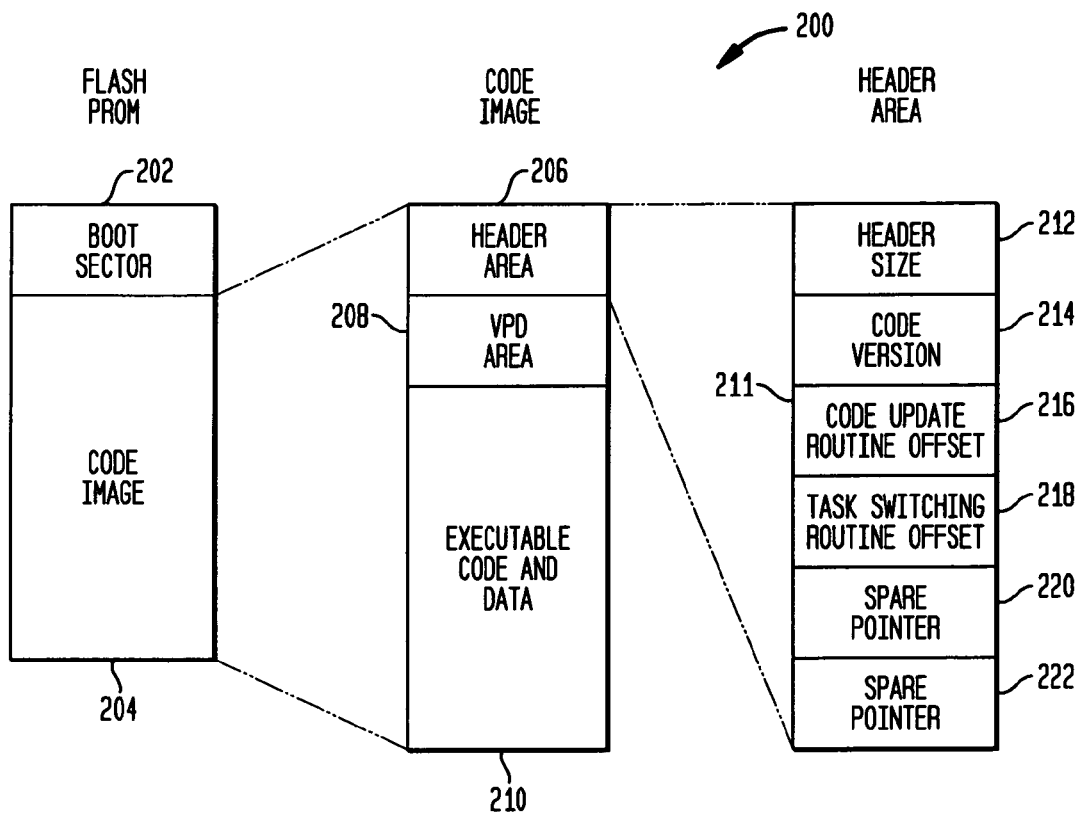
FIG. 2 is an exemplary detailed block diagram of a flash PROM map for the flash PROM illustrated in FIG. 1 according to the present invention.

FIG. 2 is an exemplary detailed block diagram of a flash PROM map 200 for the flash PROM 108 of FIG. 1, which comprises a boot sector 202 and a code image 204. The boot sector 202 includes firmware (i.e., often referred to as a "bootloader") that is executed at boot-up time and is utilized as a failsafe for a corrupted code image 204. That is, the bootloader in the boot sector 202 is executed at boot up time, in turn testing the integrity of the code image 204—preferably by computing a checksum and comparing it with a stored result or predetermined value—before actually executing the code image. The bootloader may further diagnose whether the code image 204 is corrupt and enable update of the code image if it is corrupt. If the bootloader detects an integrity error, it can use the I/O 110 to receive a firmware replacement. Alternatively, a backup code image may be provided so that a failed integrity test of the code image 204 results in the execution of the backup code image. The backup code image may be provided in another flash PROM 108 or may be stored separately from the code image 204 on the same flash PROM 108.

Now further referring to FIG. 2, the code image 204 includes a header area 206, a vital product data area (i.e., "VPD") 208, and an executable code and data area 210. The header stores information about the code image 204. The VPD area 208 stores unique product information that must be preserved through a power cycle of the embedded system 100, i.e., the product information stored in the VPD area 208 must not be lost as a result of powering off the embedded system or performing a background code update according to the present invention. The unique product information may include a variety of identification numbers (e.g., serial number), configuration settings, and the like. The executable code and data area 210 includes the compiled and linked code image, i.e., the previous firmware image that is executed prior to being updated with an incoming firmware image according to the present invention, as particularly illustrated in FIG. 3 below. The compiled and linked code image forms an output of a firmware build process, which is generally a part of product development at a manufacturing site. It should be noted that the header area 206 and/or VPD area 208 may form a part of the executable code and data area 210 as elucidated below. Alternatively, the header area 206 and/or VPD area 208 may not be present at all. The header area 206 is not required for the invention, but it makes the code image 204 more flexible. In addition, the boot sector 202 may likewise form a part of the code image 204.

The header area 206 includes a plurality of header fields 211, which include a header size 212, a code version 214 of the code image 204, an offset for the code update routines 216 in the code image 204, an offset for the task switching routines 218 in the code image 204, and two spare pointer fields 220 and 222. The spare pointer fields 220 and 222 facilitate future enhancements in the embedded system 100 that may take advantage of the header area. For example, a future firmware upgrade may require a pointer to an area in the code image 204 and the spare pointer fields 220 and 222 would provide this enhancement. That is, the spare fields 220 and 222 may be used to point to new features in the code image 204 and testing these pointer fields (i.e., for a valid address or NULL) may provide information regarding whether or not the code image 204 supports the new features. It should be noted that the foregoing list of fields 211 in the header area 206 is only exemplary and therefore the header area 206 is not limited to these particular fields. As mentioned above, the header area 206 may completely be eliminated by storing the header fields 211 at predetermined locations within the code image 204. That is, the offsets (e.g., code update routine offset 216 and task switching routine offset 218) may be present in the code image 204 at predetermined locations but not part of a formal structure in the header area 206.

Figure 3:
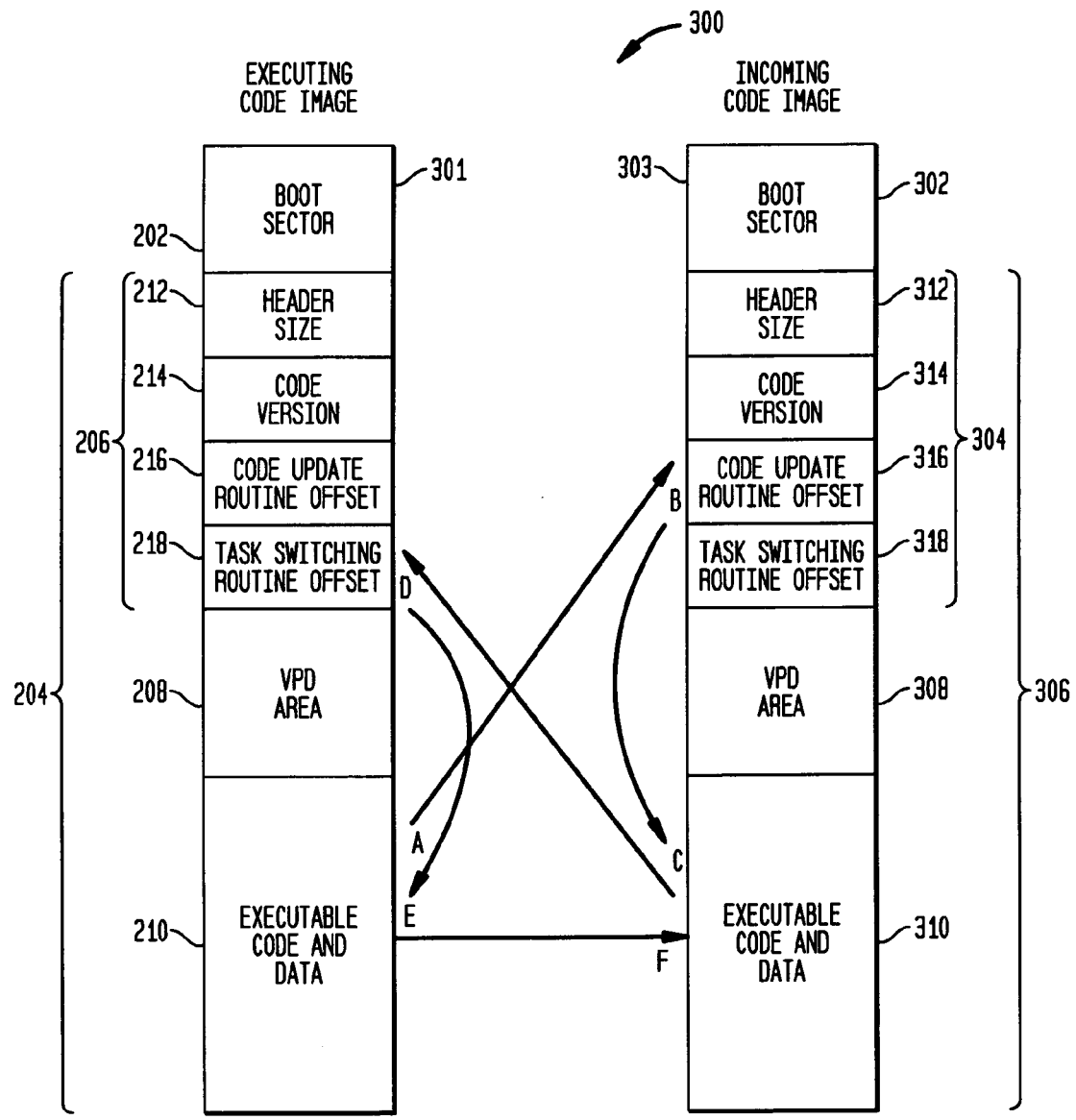
FIG. 3 is an exemplary method flow chart illustrating execution of a background firmware update utilizing code update routines from an incoming code image and a task switching function from a currently executing code image according to the present invention.

FIG. 3 is an exemplary method flow chart illustrating a background firmware update 300 of an executing code image 301 with an incoming code image 303 according to the present invention. As aforementioned regarding the fact that the boot sector 202 may form a part of the executing image 301, the boot sector 302 may likewise form a part of the incoming image 303. It is preferable that the boot sectors 202 and 302 form a part of their respective code images 301 and 303, so that the boot sectors may be upgraded via the background code update according to the present invention. It should further be noted that all or part of the incoming code image 303 is first loaded into the RAM 106 of the embedded system 100 depicted in FIG. 1, which enables the microprocessor 104 to execute the code update routines from the incoming code image 303. Subsequently, the code update routines are executed from the RAM 106 to rewrite the flash PROM 108 with the updated firmware from the firmware update transmitted via the I/O interface 110. In order to mitigate the problem of the task switching function switching to a function in the executing code image 301 while it is being overwritten by the firmware update 300, which may result in an unpredictable outcome, it is contemplated that two separate code areas that include copies of the firmware to be updated are provided in the embedded system 100, so that that the process threads being executed are not overwritten by the firmware update 300. In a first alternative, the two separate code areas represent two flash PROMs 108, where the copy of the firmware on one memory device is updated while the copy of the firmware on the other memory device is executing. That is, two flash PROM modules 108 may be provided in the embedded system 100, wherein the code update routines are executed from one of the flash PROM 108 while the other flash PROM 108 is rewritten, i.e., updated with the firmware update transmitted via the I/O interface 110. In another alternative, the two separate code areas may both be stored on a single nonvolatile memory device, which allows reading the nonvolatile memory device during update. An exemplary nonvolatile memory device that allows alternate read/write is a battery backup RAM disclosed herein. Thus, with two code images, one code image may be executed while the other code image is updated. Still further, in another alternative, the current firmware is copied from the flash PROM 108 to RAM 106 after a power-on or reset, and the flash PROM 108 is overwritten by the new firmware since current firmware resides in the RAM 106.

Now particularly referring to the method of FIG. 3, at some point in time prior to step A, the embedded system 100 is functioning in a normal manner and a background code update according to the present invention is initiated through the I/O interface 110. Thereafter, at step A, the microprocessor 104 executes the executable code 210 of the previous firmware image 301, which accesses the code update routines offset 316 of the incoming code image 303. At step B, the offset of the new code update routine 316 in the incoming code image 303 is retrieved by the executable code 210 of executing code image 301 from the header area 304 of the incoming code image 303. At step C, microprocessor control is transferred from the executing code image 301 to the incoming code image 303, i.e., executing the new code update routines from the executable code and data 310 as pointed to by the code update routine offset 316. At a later point in time, the new code update routines yield microprocessor control to any other process thread via any of the aforementioned task switching methods (e.g., time slice, event driven, round robin or a combination thereof). Notwithstanding the applicability of the present invention to the entire foregoing task switching methods, the present invention is particularly applicable to round robin method in which each process thread voluntarily gives up microprocessor control. More particularly, in order to switch to a different process thread, a task switching function is to be utilized. Therefore, at step D the new code update routines of the executable code and data 310 in the incoming code image 303 retrieve the task switching routine offset 218 from the header area 206 of the executing code image 301. Thereafter at step E, microprocessor control is thus transferred to the task switching function in the executable code and data 210, which switches microprocessor control to any other process thread, i.e., effectively executing the other process thread from the executing code image 301. Task switching is performed by a part of an operating system (not shown) of the embedded system 100, which is generally called a scheduler (not shown). The scheduler makes decisions about which process thread is to receive control of the microprocessor 104 based on process thread priorities and available resources (e.g., memory and messages) and the like. At still a later point in time, the other executing process thread yields microprocessor control. It is noted that the microprocessor control may be switched several times to various process threads within the executable code and data 210 before, at step F, the microprocessor control is eventually switched back to the new code update routines in the executable code and data 310 of the incoming code image 303.

Further with reference to FIG. 3, the foregoing control task switching is repeated until the code update process completes, which updates the executing code image 301 with the incoming code image 303. It should be noted that the task switching may be performed from and to various processes threads. The process threads may include any process threads involved in normal operations of the embedded system 100, such as process threads that provide robotic control, communications and the like. After completion of the update, the embedded system may begin execution of the newly updated firmware, i.e., firmware written to the flash PROM 108, in the embedded system 100. This may be accomplished via a branch or a jump instruction to a flash PROM address, or a function call to the flash PROM address. Alternatively, the microprocessor 104 may begin execution of the updated firmware via a reset of the embedded system 100. The reset may be accomplished through firmware control, power off and the like. The reset may further be initiated by the overall system that comprises the microprocessor 104, by another component of the overall system (e.g., another embedded processor), by an operator, or by a device that transmitted the incoming firmware image via I/O interface 110 to the embedded system 100.

As particularly described above, the exemplary method enables a background code update in an embedded system by utilizing the code update routines from the incoming code image and a task switching function from the executing code image. In a further preferred embodiment, one or both of the firmware images (i.e., the executing and the incoming code images) include pointers to any required functions. For example, there may be pointers to a task switching function and code update routines. More particularly, the firmware images 301 and 303 may have header areas, such as 206 and 304 respectively, where these pointers are defined as 216, 316 and 218, 318 for the task switching function and code update routines respectively. Optionally, these pointers may be located at predefined locations in the code image. Thus, when a code update begins, by utilizing the pointers in the incoming code image 303 for the code update 316, the code update routines are executed out of the incoming code image 303, i.e., from the executable code and data 310 of the incoming code image 303. These code update routines will look at the currently executing code image, loaded in the flash PROM 108 or RAM 106 of the embedded system 100 to identify where the task switching function is really located in the executing code image 301. Still further, there may not be any pointers at all, in which case the code update routines and/or task switching function would reside at predetermined locations in the respective code images. Therefore, what has been described in detail herein is a novel system and method for enabling task switching to occur while providing the necessary background code update process.

Figure 4:
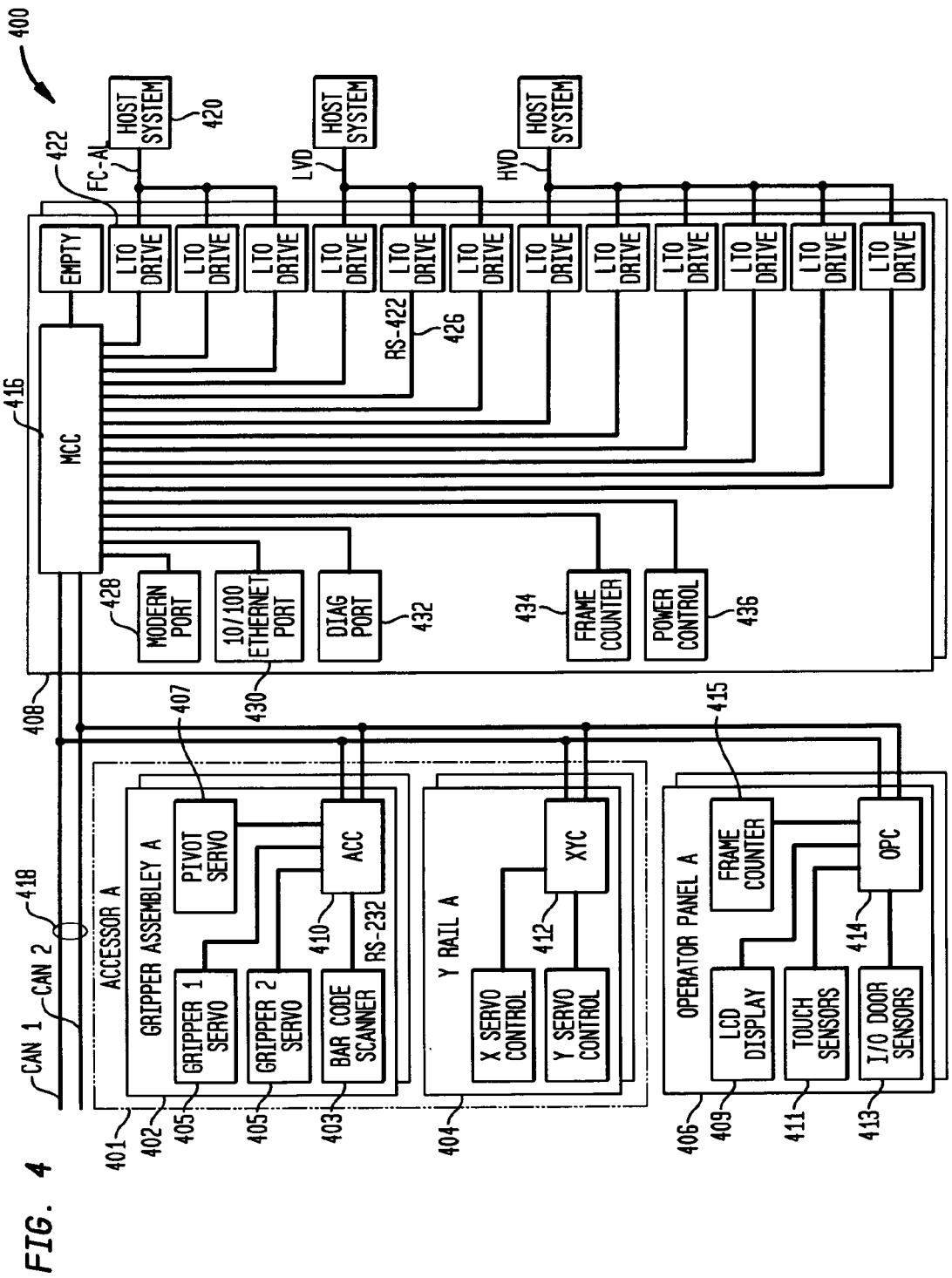
FIG. 4 is an exemplary frame of a storage automation library that utilizes a plurality of embedded systems each of which is upgradable via the background code update that utilizes firmware update routines from an incoming code image and a task switching function from an executing code image according to the present invention.

FIG. 4 is an exemplary frame 400 of a storage automation library that utilizes a plurality embedded systems of FIG. 1, the firmware of which is upgradable via the background code update that utilizes firmware update routines from an incoming code image and a task switching function from an executing code image, according to the present invention as particularly illustrated with regard to FIGS. 1–3. The exemplary frame 400 is all or part of an automation library, i.e., IBM's Ultra Scalable Tape Library 3584. The frame 400 comprises an Accessor assembly 401, which includes a gripper assembly 402 and an XY assembly 404; and a front door (i.e., reference 508 depicted in FIG. 5 below) that includes the operator panel assembly 406 and one or two import/export I/O stations (i.e., references 512 and 514 depicted in FIG. 5 below). The I/O stations are utilized for operator input/output of removable media.

The frame 400 may comprise one to twelve drives 422. The drives may be any combination of small computer system interfaces, such as SCSI LVD, SCSI HVD, and Fibre Channel-Arbitrated Loop. The drives are coupled via interfaces 426 to the Medium Change Controller (i.e., "MCC") card 416 for enabling the storage automation library to communicate with drives 422. Interface 426 may comprise any serial interface known to those skilled in the art. The communication from the storage automation library to host 420 travels through the same connection, i.e., interface 426.

The MCC card 416 also includes a diagnostic interface 432, a 10/100 Ethernet interface 430, a modem interface 428 for connecting to a modem, circuits to control the DC power in the library 436, and frame counting circuits 434 for a multi-frame automation library. The diagnostic interface 432 utilizes a protocol and a command structure and is used by repair personnel. The 10/100 Ethernet interface 430 provides Simple Network Management Protocol (i.e., "SNMP") support and Hyper Text Transfer Protocol (i.e., "HTTP") support. The modem interface enables the automation library to initiate a call to a repair center for help (i.e., via "Call Home") and it also enables the repair center to call the library (i.e., via "Call In"). The MCC card 416 monitors and controls the DC power and the DC power supply fans through power control circuits 436. The frame counting circuits 434 count the number of frames in the multi-frame automation library. With the frame counting circuits 434, the MCC card 416 can tell which frame number it is connected to as well as any doors that may be open in any frame.

The MCC card 416 communicates to the Accessor Controller card (i.e., "ACC") 410, the XY Controller (i.e., "XYC") card 412, the Operator Panel Controller (i.e., "OPC") card 414, and any other frame cards that may be installed in the automation library. A Controller Area Network (i.e., "CAN") 418 interface provides communication between the cards 410, 412, 414 and 416 in the automation library. The CAN is a multi-drop network interface, which although designed originally for the automotive industry, has gained wide acceptance in the industrial control industry and is currently utilized in the storage automation library according to the present invention. It should be noted that the CAN interface preferably comprises two CAN busses, one for primary communication and one for redundant operation in an event of a failure of the primary CAN bus.

The Accessor assembly 401 includes a XY rail assembly 404, which comprises an XY motion control card 412 and motors (not shown). The Accessor assembly further includes a gripper assembly 402, which comprises a dual gripper motion control card 410 and motors (not shown). The XY rail assembly 404 moves back and forth along a length of the automation library on the X rail (i.e., reference 530 depicted in FIG. 5 below). The gripper assembly 402 moves up and down the Y rail (i.e., reference 532 depicted in FIG. 5 below) under control of the XY assembly 404. The gripper assembly 402 further comprises a bar code scanner 403 for reading cartridge labels and preferably includes a smart card reader for reading an electronic cartridge memory inside an LTO cartridge (not shown). The gripper assembly 402 still further comprises two grippers 405 for mixed media support, i.e., two different media types in a single automation library. Alternatively, the gripper assembly may comprise a redundant gripper for a single media type. The grippers are mounted in a cage that can pivot from one side of the library to the other via a pivot mechanism 407. This allows access to both walls of storage by either of the grippers 405.

The operator panel 406 includes an LCD display (preferably of high-resolution) 409, a touch screen for user input 411, a frame counter 415 (like the frame counter 434 of the MCC card 416), and sensor circuits 413 to monitor and control the I/O station doors. That is, the sensors circuits 413 monitor the state of the doors, such as opened, closed, or locked. The I/O station doors are manually opened and closed by an operator. Lock mechanisms are controlled by the OPC card 414 and will prevent a user from opening a I/O station door. The upper I/O station (i.e., reference 512 depicted in FIG. 5 below) is required. The lower I/O station (i.e., reference 514 depicted in FIG. 5 below) is optional.

The following describes the background code update of the MCC 416 embedded system, in frame 400 of the storage automation library according to the present invention. It should be noted that the firmware of the other embedded systems, i.e., 410, 412 and 414, may be similarly updated as described below. In normal operation, the MCC 416 of the storage automation library moves storage cartridges between storage slots (depicted in FIG. 5 below) and LTO drives, as requested by each host system 420. A request to update the storage automation library firmware is transmitted through the diagnostic port 432 or is transmitted from a host computer 420 through interface 426. The update request may be in the form of a proprietary command and protocol, or may be a common command and protocol such as the SCSI Write Buffer command. During the firmware update, the MCC 416 receives the incoming code image via its I/O interface 110 and writes the incoming code image to the flash PROM 108 while performing other MCC tasks such as drive communication, serving web pages from the Ethernet port 430, and the like. Each ACC card 410, XYC card 412 and OPC card 414 comprises a respective flash PROM memory 108, which is updated with the newest firmware in a similar fashion while performing respective storage automation library operational tasks, such as XY motion, gripping and releasing cartridges handling operator input from a panel display, and the like. Furthermore, each of these cards 410, 412, 414 and 416 task switches between normal library operations and the code update operations according to the present invention.

Figure 5:
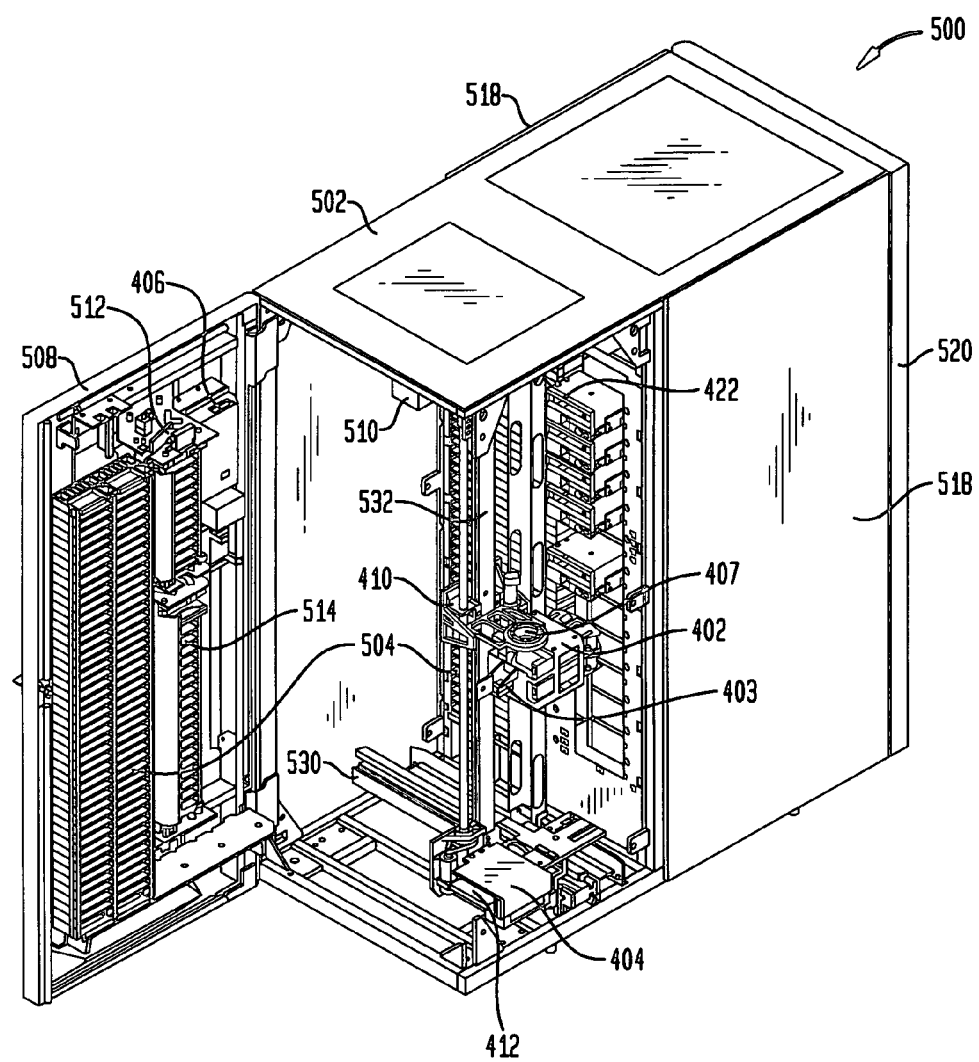
FIG. 5 is an exemplary overview representation an L-frame that houses the exemplary frame of FIG. 4 according to the present invention.

FIG. 5 is an exemplary representation of L-frame 500 of the frame 400 of FIG. 4 according to the present invention. The L-frame 500 is depicted with a front door 508 that is open. The housing of the L-frame 500 comprises front door 508, top panel 502, side panels 518, and back panel 520. Storage slots 504 are utilized to hold cartridges (not shown) to be utilized in the LTO drives 422. As aforementioned with reference to FIG. 4, the L-frame 500 may comprise up to 12 LTO drives 422. The L-frame 500 further comprises a door switch 510 for locking the front door 508. The I/O stations 512 and 514 provide the I/O interface to the frame 400. The operator panel assembly 406 provides a touch screen for user input as aforementioned with reference to FIG. 4. Further as mentioned above with reference to FIG. 4, the Accessor assembly 401 includes the XY rail assembly 404, which comprises the XY motion control card 412. The XY rail assembly 404 moves back and forth along a length of the automation library on the X rail 530. The gripper assembly 402 moves up and down the Y rail 532 under control of the XY assembly 404. The Accessor assembly 401 further includes a gripper assembly 402, which comprises the ACC card 410, the bar code scanner 403 for reading cartridge labels, and preferably a smart card reader for reading an electronic cartridge memory (not shown) inside the cartridge (not shown). As aforementioned with reference to FIG. 4, the gripper assembly 402 comprises two grippers 405 for mixed media support or a redundant gripper for a single media type. The grippers 405 are mounted in a cage that can pivot from one side of the library to the other via a pivot mechanism 407.

While the invention has been particularly shown and described with regard to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. A method for performing a background code update of a current code image with an incoming code image in an embedded system, the method comprising the steps of:
    (a) executing the current code image in the embedded system;
    (b) executing one or more code update routines from the incoming code image to update the current code image with the incoming code image;
    (c) retrieving, by the one or more code update routines, a task switching routine offset from the current code image resulting in the one or more code update routines transferring control to task switching functions of the current code image; and
    (d) executing a task switching function from the current code image to switch microprocessor control from executing the one or more code update routines of the incoming image to execute a function in the current code image.

2. The method according to claim 1, wherein the method further comprises a step of retrieving an offset from the incoming code image for the one or more code update routines in the incoming code image.

3. The method according to claim 1, wherein the method further comprises a step of testing the offset of the task switching function for validity before executing the task switching function.

4. The method according to claim 1, wherein the method further comprising a step of loading all or part of the incoming code image into random access memory for execution.

5. The method according to claim 1, wherein the method further comprises receiving the incoming code image into the embedded system via an input/output interface.

6. The method according to claim 1, wherein the method further comprises the steps of:
providing a plurality of programmable memory devices for storing copies of the current code image;
executing a copy of the current code image from one programmable memory device; and
updating a copy of the current code image in other programmable memory device with the incoming code image.

7. The method according to claim 1, wherein the method further comprises the steps of:
yielding microprocessor control by the executing function upon a task switching event; and
switching microprocessor control to continue executing the one or more code update routines to update the current code image with the incoming code image.

8. The method according to claim 7, wherein the method further comprises a step of continuing to switch microprocessor control between the one or more code update routines of the incoming code image and one or more functions of the current code image until the background code update completes.

9. The method according to claim 7, wherein the task switching event is one selected from the group consisting of: round robin task switching; event driven task switching; and time slice task switching.

10. The method according to claim 1, wherein the task switching event is one selected from the group consisting of: round robin task switching; event driven task switching; and time slice task switching.

11. The method according to claim 1, wherein the method further comprises a step of resetting the embedded system upon completion of the background code update.

12. An embedded system for performing a background code update of a current code image with an incoming code image, the system comprising:
a first programmable memory device for storing the current code image;
a microprocessor for executing the current code image in the embedded system and for executing one or more code update routines to update the current code image with the incoming code image; wherein the one or more code update routines retrieve a task switching routine offset from the current code image resulting in the one or more code update routines transferring control to task switching functions of the current code image; and
a task switching means for executing a task switching function in the current code image to switch microprocessor control from executing the one or more code update routines of the incoming image to execute a function in the current code image.

13. The embedded system according to claim 12, wherein the embedded system further comprises a random access memory for loading all or part of the incoming code image for execution by the microprocessor.

14. The embedded system according to claim 13, wherein the embedded system further comprises an input/output interface for receiving the incoming code image into the embedded system.

15. The embedded system according to claim 14, wherein the embedded system comprises a bus for interconnecting one or more system components including the microprocessor, the random access memory, the first programmable memory device, and the input/output interface.

16. The embedded system according to claim 15, wherein one or more of the system components form a part of an integrated microprocessor.

17. The embedded system according to claim 12, wherein the embedded system further comprises a second programmable memory device for storing a copy of the current code image, wherein the microprocessor executes the current code image from the first programmable memory device and updates the copy of the current code image in the second programmable memory device with the incoming code image.

18. The embedded system according to claim 12, wherein the incoming code image instructs the microprocessor to further test the offset of the task switching function for validity before executing the task switching function.

19. The embedded system according to claim 12, wherein the task switching means further switches microprocessor control from the executing function to continue executing the one or more code update routines to update the current code image with the incoming code image.

20. The embedded system according to claim 19, wherein the task switching means is one selected from the group consisting of: round robin task switching; event driven task switching; and time slice task switching.

21. The embedded system according to claim 19, wherein the switching function instructs the microprocessor to switch control between the one or more code update routines of the incoming code image and one or more functions of the current code image until the background code update completes.

22. The embedded system according to claim 12, wherein the task switching means is one selected from the group consisting of: round robin task switching; event driven task switching; and time slice task switching.

23. The embedded system according to claim 12, wherein the embedded system further comprises a bootloader for instructing the microprocessor to execute the current code image and the one or more code update routines of the incoming code image, and to reset the embedded system upon completion of the background code update.

24. The embedded system according to claim 23, wherein the programmable memory device comprises a boot sector for storing the bootloader.

25. The embedded system according to claim 23, wherein the bootloader tests the integrity of the current code image before instructing the microprocessor to execute it.

26. The embedded system according to claim 23, wherein the bootloader is enabled to check for availability of a code update and if the code update is available to initiate the code update.

27. The embedded system according to claim 12, wherein the current code image and the incoming code image include offsets within each respective image for code update routines and a task switching function.

28. The embedded system according to claim 12, wherein offsets for the code update routines and the task switching function are stored at predetermined locations within each respective code image.

29. A storage automation library comprising an embedded system, the embedded system comprising:
a first programmable memory device for storing the current code image;
a microprocessor for executing the current code image in the embedded system and for executing one or more code update routines to update the current code image with the incoming code image, wherein the one or more code update routine retrieve a task switching routine offset from the current code image resulting in the one or more code update routines transferring control to task switching functions of the current code image; and
a task switching means for executing a task switching function in the current image to switch microprocessor control from executing the one or more code update routines of the incoming image to execute a function in the current code image.

30. A program storage device, tangibly embodying a program of instructions executable by a machine to perform a method for performing a background code update of a current code image with an incoming code image in an embedded system, the method comprising the steps of:
(a) executing the current code image in the embedded system;
(b) executing one or more code update routines from the incoming code image to update the current code image with the incoming code image; and
(c) retrieving, by the one or more update routines, a task switching routine offset from the current code image resulting in the one or more code update routines transferring control to task switching functions of the current code image, and
(d) executing a task switching function from the current code image to switch microprocessor control from executing the one or more code update routines of the incoming image to execute a function in the current code image.

31. The program storage device according to claim 30, wherein the method further comprises a step of retrieving an offset from the incoming code image for the one or more code update routines in the incoming code image.

32. The program storage device according to claim 30, wherein the method further comprises a step of loading all or part of the incoming code image into random access memory for execution.

33. The program storage device according to claim 30, wherein the method further comprises receiving the incoming code image into the embedded system via an input/output interface.

34. The program storage device according to claim 30, wherein the method further comprises the steps of:
providing a plurality of programmable memory devices for storing copies of the current code image;
executing a copy of the current code image from one programmable memory device; and
updating a copy of the current code image in the other programmable memory device with the incoming code image.

35. The program storage device according to claim 30, wherein the method further comprises a step of testing the offset of the task switching function for validity before executing the task switching function.

36. The program storage device according to claim 30, wherein the method further comprises the steps of:
yielding microprocessor control by the executing function upon a task switching event; and
switching microprocessor control to continue executing the one or more code update routines to update the current code image with the incoming code image.

37. The program storage device according to claim 36, wherein the method further comprises a step of switching microprocessor control between the one or more code update routines of the incoming code image and one or more functions of the current code image until the background code update completes.

38. The method according to claim 36, wherein the task switching event is one selected from the group consisting of: round robin task switching; event driven task switching; and time slice task switching.

39. The program storage device according to claim 30, wherein the task switching event is one selected from the group consisting of: round robin task switching; event driven task switching; and time slice task switching.

40. The program storage device according to claim 30, wherein the method further comprises a step of resetting the embedded system upon completion of the background code update.

41. A method for performing a background code update of a current code image with an incoming code image in an embedded system, the method comprising the steps of:
(a) executing the current code image in the embedded system;
(b) retrieving an offset from the incoming code image of one or more code update routines in the incoming code image;
(c) executing the one or more code update routines to update the current code image with the incoming code image;
(d) retrieving, by the update routine, a task switching offset from the current code image resulting in the one or more code update routines transferring control to task switching functions of the current code image upon a task switching event; and
(e) executing the task switching function originating from the current code image to switch microprocessor control from executing the one or more code update routines of the incoming image to execute a function in the current code image.

* * * * *